3,711,487
CERTAIN α,α-DISUBSTITUTED BENZYL-
IMIDAZOLES AND SALTS
Wilfried Draber, Helmut Timmler, Karl-Heinz Buchel,
and Manfred Plempel, Wuppertal-Elberfeld, Germany,
assignors to Farbenfabriken Bayer Aktiengesellschaft,
Leverkusen, Germany
No Drawing. Filed Feb. 19, 1970, Ser. No. 12,830
Claims priority, application Germany, Feb. 22, 1969,
P 19 08 991.9
Int. Cl. C07d 31/50, 49/36
U.S. Cl. 260—294.8 G                22 Claims

ABSTRACT OF THE DISCLOSURE

Anti-mycotic compounds and salts are provided which are α,α-disubstituted benzylimidazoles or salts. Preparations in various dosage forms are disclosed containing 0.5–10% of active compound. A representative compound is cyclohexylphenyl-4-pyridyl-1-imidazolyl-methane. The compounds are active against both Hyphomycetes and yeasts and are compatible with warm-blooded animals.

The present invention relates to certain new α,α-disubstituted N-benzylimidazoles and their pharmaceutically acceptable salts and to a process for their preparation, as well as to anti-mycotic preparations containing the same and their administration.

The present invention accordingly provides new compounds of the formula:

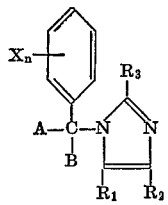

(I)

wherein $R_1$, $R_2$ and $R_3$ are each hydrogen or lower alkyl,
X is hydrogen, alkyl, alkoxy or mercaptoalkyl, or an electronegative or basic substituent,
n is 0, 1 or 2,
A is unsubstituted or substituted phenyl, pyridyl, alkyl or cycloalkyl, and
B is an aliphatic radical or an aromatic radical, and non-toxic salts thereof.

The alkyl radicals $R_1$, $R_2$, $R_3$ are preferably straight chain but may be branched and may contain a double bond. They preferably have 1 to 4 carbon atoms. The same applies, mutatis mutandis, to the alkyl, alkoxy and mercaptoalkyl groups X which preferably have 1 to 4 carbon atoms.

Suitable examples of electronegative substituents are the halogens (fluorine, chlorine, bromine or iodine), nitro, cyano and trifluoromethyl.

Suitable examples of basic substituents are amino, lower monoalkylamino and lower di-alkylamino, including preferably 5- or 6-membered cycloaliphatic radicals, piperidino, pyrrolidino, morpholino and N-lower-alkyl-piperazine.

Examples of substituents for A when it is phenyl or cycloalkyl are particularly fluorine, chlorine, and methyl. Preferred cycloalkyl radicals are those with 5, or most preferably 6, carbon atoms in the ring system. Specific examples of cycloalkyl radicals are cyclohexyl, cyclopentyl and cyclopropyl. Examples of substituents for A when it is pyridyl are particularly fluorine, chlorine, methyl. When A is pyridyl, it may be linked to the central carbon atom in the 2-, 3- or 4-position.

The aliphatic radicals or alkyl radicals A and B may be straight-chain or branched alkyl radicals with 1 to 12, preferably 1 to 4 carbon atoms, which may also contain a double bond, or they may be mono- or bi- or tri-cyclic radicals which may contain endomethylene bridges. Preferred cyclo radicals are those with 3 to 12, preferably 5 or 6, carbon atoms in the ring system.

The aromatic radical B has 6 to 10 carbon atoms and is preferably phenyl. Specific examples of alkyl, alkenyl or cycloalkyl for B are methyl, isopropyl, allyl, t-butyl, 1-methylcyclopropyl, cyclopropyl, cyclopentyl, cyclohexyl, norbornyl and adamantyl.

For pharmaceutical purposes, the preferred salts of the new α,α-disubstituted N-benzylimidazoles are naturally those, which are physiologically compatible. Examples of inorganic acids giving such salts include halogen hydracids, phosphoric acids, sulphonic acids, mono- and dicarboxylic acids and hydroxycarboxylic acids. Examples of organic acids are acetic acid, tartaric acid, lactic acid, malic acid, citric acid, salicylic acid and sorbic acid. For the information of other salts, other non-toxic acids may be used.

The invention also provides a process for the production of an α,α-disubstituted N-benzylimidazole according to the invention in which a compound of the formula:

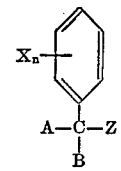

(II)

in which

A, B and $X_n$ have the above stated meanings and
Z is chlorine or bromine, is reacted, optionally in the presence of an acid acceptor, with at least the theoretically necessary amount of an imidazole, which may be lower alkyl substituted, in an organic solvent in the temperature range of 20° C. to 150° C.

The process can be started from a compound in which Z=OH, this compound being reacted with a halogenating agent, such as thionyl chloride, thionyl bromide, phosphoryl chloride, phosphoryl bromide, acetyl chloride or acetyl bromide, in a solvent such as an ether, methylene chloride, benzene or toluene. It may be expedient to carry out the halogenation in a polar solvent, and to follow directly with the reaction with the imidazole, without intermediate isolation of the halide. Examples of suitable polar organic solvents are acetonitrile, nitromethane, dimethylformamide and hexamethylphosphoric acid triamide.

In carrying out the process, the α,α-disubstituted benzyl halide may be added to the imidazole, either in solution or in solid form.

The working up of the reaction mixture may be carried out in customary manner, for example, by concentration or after dilution with water.

Some of the new compounds are identified in Table I, in which the meanings of A, B and X in Formula I are given ($R_1=R_2=R_3=H$ and $n=1$).

TABLE I

| A | B | X | °C. |
|---|---|---|---|
| (a) 4-pyridyl | Cyclohexyl | H | 90. |
| (b) Cyclohexyl | do | H | 150–153. |
| (c) Phenyl | t-Butyl | H | 120. |
| (d) do | do | 4-F | 117. |
| (e) do | do | 2-Cl | Oil $n_D^{20}=1.5453$. |
| (f) do | do | 4-Cl | 137. |
| (g) do | do | 3-CF$_3$ | 209 (hydrochloride). |
| (h) do | do | 3-Cl | 90. |
| (i) do | do | 4-CH$_3$ | 139. |
| (k) do | do | 3-CH$_3$ | 87. |
| (l) 4-chlorophenyl | do | 4-Cl | 196 (hydrochloride). |
| (m) Phenyl | do | 2-CH$_3$ | 112. |
| (n) do | do | 4-F | 173 (hydrochloride). |
| (o) do | do | 4-Cl | 181 (hydrochloride). |
| (p) do | do | H | 170 (hydrochloride). |
| (q) do | Methyl | H | 195 (hydrochloride). |
| (r) do | t-Butyl | 4-SCH$_3$ | 141 (hydrochloride). |
| (s) Cyclopropyl | Phenyl | H | 110. |
| (t) do | Cyclopropyl | 4-Cl | 141 (hydrochloride). |
| (u) 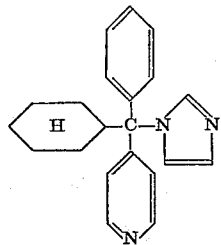 | Phenyl | H | 65. |
| (v) 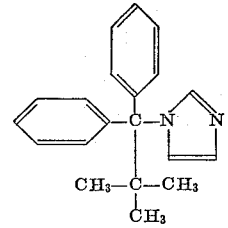 | do | H | 117–119. |

The invention is illustrated by the following non-limitative examples.

EXAMPLE 1

28.6 g. (0.1 mole) of cyclohexylphenyl-4-pyridylchloromethane (M.P. 114° C.) and 34 g. (0.5 mole) of imidazole were heated to 150° C. for 2 hours. The light-brown melt was cooled, water was added, and it was taken up with methylene chloride. The organic phase was extracted three times with water, separated, dried and concentrated. The residue crystallized after addition of a little ether and trituration. The product was filtered off with suction and washed with a little cold ether. There were obtained 18.4 g. (58%) of cyclohexylphenyl-4-pyridyl-1-imidazolyl-methane of the formula:

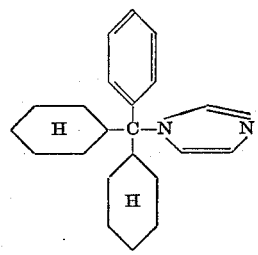

(III)

in the form of white crystals of M.P. 85–90° C.

For analysis, the substance is dissolved in dilute hydrochloric acid, followed by filtration with activated charcoal and precipitated with ammonia; the melting point is then 90° C.

EXAMPLE 2

29.1 g. (0.1 mole) of dicyclohexylphenylchloromethane (M.P. 130° C.) and 34 g. (0.5 mole) of imidazole were heated to 170° C. for 2 hours. About 50 ml. of methanol and 200 ml. of ice water were added to the cooled melt, which was then acidified with hydrochloric acid and filtered with charcoal. Alkalinization was then effected with a solution of sodium hydroxide, and the colorless flocculent precipitate was taken up with methylene chloride. After drying and concentration, a glassy residue was obtained which was taken up in ether, filtered and again concentrated. The product was recrystallized from ether/N-pentane. There were obtained 20.5 g. of dicyclohexylphenyl-1-imidazolylmethane of the formula:

(IV)

of M.P. 150–153° C.

EXAMPLE 3

25.9 g. of 1-chloro-1,1-diphenyl-2,2,2-trimethylethane (M.P. 67° C.) were dissolved in 200 ml. of hexamethylphosphoric acid triamide and stirred with 68 g. (1 mole) of imidazole for 15 hours at 170° C. The solvent was then distilled off in a vacuum, the residue was digested with water and filtered off with suction. After recrystallization from a 20-fold amount of ligroin, there were obtained 19.4 g. (67%) of 1,1-diphenyl-2,2,2-trimethyl-ethyl-1-imidazolylmethane of the formula:

(V)

The same results were achieved when, instead of the chlorides, the bromides were used as the starting compounds.

The anti-mycotics known hitherto are either effective only against yeasts such as amphotericin B, or only against Hyphomycetes, such as griseofulvin.

In comparison, the compounds of the invention, for example a, b and c in Table I and their salts, act surprisingly, even in the case of oral administration, against both Hyphomycetes and yeasts. A further advantage of the compounds according to the invention lies in their compatibility with warm-blooded animals.

The application of the compounds as anti-mycotics may take place as, inter alia, aqueous emulsions, suspensions or solutions, which may be applied orally. It is also possible to use aqueous solutions of the new compounds, for example a, b and c in Table I, or their salts.

Therapeutic effect (1) In vitro effectiveness against fungi pathogenic to humans:

The new compound as well as their salts with physiologically compatible acids, for example compounds a, b and c of Table I, show good and broad fungistatic effectiveness against fungi pathogenic to humans. The minimum inhibitory concentrations in vitro on Sabouraud's test medium are summarized in Table II (all particulars given in γ/ml. substrate),

TABLE II

| Compounds of Table I | Trichophyton spec. | Mikrosporon felineum | Candida albicans | Penicill. commune | Aspergillus spec. |
|---|---|---|---|---|---|
| a | 4 | 40 | 10 | 40 | 100 |
| b | <4 | <4 | <4 | 10 | 10 |
| c | 1-2 | 1 | 2 | 1 | 1 |
| d | <4 | | <4 | | |
| e | <4 | | 4 | | |
| f | <4 | | 4 | | |
| g | <4 | | 4 | | |
| h | <4 | | 4 | | |
| i | <4 | | 4 | | |
| j | | | | | |
| k | <4 | | 10 | | |
| l | <4 | | 100 | | |
| m | <1 | | 1 | | |
| n | <4 | | 1 | | |
| o | <4 | | 1 | | |
| p | <4 | | 4 | | |
| q | <4 | | 10 | | |
| r | <4 | | 4 | | |
| s | <1 | | 1 | | |
| t | <1 | | 1 | | |
| u | <1 | | 1 | | |

(2) In vivo effectiveness:

The investigations were carried out with the compounds a, b, c, d, f, o, p, h and m of Table I.

In an animal experiment using Candida-infected white mice ($CF_1$, SPF), the compounds are curatively effective when applied orally 1-2 times 30-60 mg./kg. body weight. For example, after treatment with compounds c, d, f, o, p, k and m at the dosage stated, 16 of 20 animals survive the infection, while in the case of the untreated control animals 0-2 survive 6 days after infection. The blood levels in the dosage stated are, on the average, about 5-12 γ/ml.; level maxima occur 4-6 hours after administration. The acute toxicity of the preparations in several animal species lies between about 500 and 800 mg./kg. in the case of oral administration.

Experimental trichophytosis:

With guinea pigs, with oral administration of about 30 to 50 mg./kg. of compound c or o twice daily (weight of the guinea pigs about 400 to 600 g.), the incipience of the infection (*Trichophyton mentagrophytes* and *Trichophyton rubrum*) is prevented. In a therapeutic experiment, there is a rapid healing of the mycotic lesions.

When, instead of the compounds a, b or c, other compounds (including salts) of the invention are used, similar results are achieved.

Of particular interest, for practical use are compounds which are unsubstituted at the imidazole ring and optionally substituted in one phenyl radical by a halogen atom (preferably chlorine or fluorine in o-, m-, or p-position) or a lower alkyl radical, as well as their salts with hydrochloric acid, lactic acid or salicylic acid.

As indication fields for the imidazoles according to the invention when used as chemotherapeutic agents, there are envisaged:

(a) in human medicine (1) Dermatomycoses caused by fungi of the species Trichophyton, Microsporium, Epidermophyton, Aspergillus, *Candida albicans* and other yeasts, especially Coccidioides, Histoplasma and Blastomyces.

(2) Organmycoses caused by yeasts, mould fungi and dermatophytes.

(b) in veterinary medicine

Dermatomycoses and organmycoses caused by yeasts, mould fungi and dermatophytes.

Therapeutic application or administration is effected orally or parenterally, as well as locally or topically in the form of solutions (for example in dimethylsulphoxide/glycerol/water 2:2:6), alcohol, preferably ethanol and isopropanol, buffer solutions, powders or tablets.

Dosage for humans is, on the average, from 15 to 60 mg./kg. of body weight, preferably 20 to 40 mg./kg. body weight, at an interval of up to 12 hours with an average duration of therapy of 14-20 days.

Nevertheless, it may sometimes be necessary to deviate from the above amounts, depending on the method of application, or because of the individual reaction towards the medicament or the nature of its formulation and the stage in time or interval at which administration takes place. Thus, it may in some cases be possible to manage with less than the aforesaid minimum amount, whereas in other cases the stated upper limit can be exceeded. In the case of application of larger amounts, it is usually advisable to distribute these in several individual doses over the day.

The chemotherapeutic agents may be used either as such or in combination with pharmaceutically acceptable vehicles. Suitable administration forms, which may be in combination with diluents or carriers, are tablets, capsules, powders, sprays, aqueous suspensions, injectable solutions, elixirs and syrups. Such vehicles include solid diluents or fillers, a sterile aqueous medium as well as various non-toxic organic solvents and the like. The tablets and the like suitable for oral administration may be provided with sweetening additives, coloring agents and the like. The therapeutically effective compound should in the aforesaid case generally be present in a concentration of about 0.5 to 5 percent by weight of the total mixture, that is, in amounts which are sufficient to achieve the above-mentioned dosage margin.

In the case of oral application, the tablets may also contain additives such as sodium citrate, calcium carbonate and dicalcium phosphate together with various adjuvants, such as starch, preferably potato starch, and the like, and binders, such as polyvinylpyrrolidone, gelatin and the like. Furthermore, lubricants, such as magnesium stearate, sodium lauryl sulphate and talc can be used for tablet-making. In the case of aqueous suspensions and/or elixirs which are intended for oral applications, the active compound can be used with various taste improvers, dyestuffs, emulsifiers and/or together with diluents such as water, ethanol, propylene glycol, glycerol and similar such compounds or combinations.

For parenteral application, solutions of the active compounds in sesame oil or arachis oil or in aqueous propylene glycol or N,N-dimethylformamide can be used, as well as sterile aqueous solutions in the case of the water-soluble compounds. Such aqueous solutions should if necessary be buffered in customary manner and, furthermore, the liquid diluent should be rendered isotonic beforehand by addition of the requisite amount of salt or glucose. Such aqueous solutions are particularly suitable for intravenous, intramuscular and intraperitoneal injections.

As can be seen from the above, the invention provides a pharmaceutical composition comprising one or more of the new active compounds in admixture with a pharmaceutically acceptable solid or liquid diluent or carrier.

The invention further provides a medicament in dosage unit form comprising at least one of the new active compounds either alone or in admixture with a pharmaceutically acceptable solid or liquid diluent or carrier. The medicament may include a protective envelope containing the active compound and, if used, the diluent or carrier.

The term "medicament in dosage unit form" as used in the present specification means a medicament as defined above in the form of discrete portions each containing a unit dose, or a multiple or sub-multiple of a unit dose of the active compound or compounds. Such portions may, for example, be in monolithic coherent form, such as tablets, suppositories, pills or dragées; in wrapped or concealed form, such as wrapped powders, cachets, sachets, or capsules; in ampoules, either free or as a sterile solution suitable for parenteral injection; or in any other form mentioned above or known to the art.

In particular, the invention provides medicaments for oral use and ointments, creams and lotions for topical or local application, containing the compounds of the invention. In the case of ointments, creans and lotions for topical application, a content of the compound of 0.5 to 10% by weight is generally suitable.

Besides the antimycotic effect, the compounds of the invention possess an activity against pathogenic protozoa, for example, Trypanosomes, Trichomonades, *Entamoeba histolytica*, and malaria causative organisms as well as against bacteria, for example, Staphylococci, Streptococci and *E. coli*.

The embodiments of the invention in which an exclusive property or privilege is claimed are defined as follows:

1. A compound of the formula:

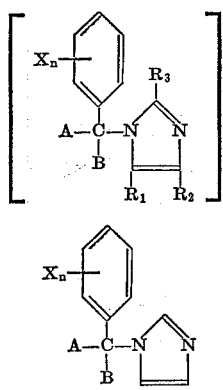

wherein
X is hydrogen, lower alkyl, lower alkoxy or mercapto lower alkyl, halogen, nitro, cyano, trifluoromethyl, or di-alkylamino of 1 to 4 carbon atoms,
$n$ is 0, 1 or 2,
A is phenyl, phenyl substituted by halogen or lower alkyl, pyridyl, pyridyl substituted by halogen or lower alkyl, lower alkyl, cycloalkyl of 3 to 6 carbon atoms, nor-bornyl, or adamantyl, and
lower alkyl or cycloalkyl of 3 to 6 carbon atoms or a non-toxic pharmaceutically acceptable salt thereof.

2. The compound of claim 1 which is cyclohexyl-phenyl-4-pyridyl-1-imidazolyl-methane.
3. The compound of claim 1 which is dicyclohexyl-phenyl-1-imidazolyl-methane.
4. The compound of claim 1 which is 1,1-diphenyl-2,2,2-trimethylethyl-1-imidazolylmethane.
5. The compound according to claim 1, wherein X is 4-F, $n$ is 1, A is phenyl and B is t-butyl.
6. The compound according to claim 1, wherein X is 2-Cl, $n$ is 1, A is phenyl and B is t-butyl.
7. The compound according to claim 1, wherein X is 4-Cl, $n$ is 1, A is phenyl and B is t-butyl.
8. The compound according to claim 1, wherein X is 3-$CF_3$, $n$ is 1, A is phenyl and B is t-butyl in the form of the hydrochloride salt.
9. The compound according to claim 1, wherein X is 3-Cl, $n$ is 1, A is phenyl and B is t-butyl.
10. The compound according to claim 1, wherein X is 4-$CH_3$, $n$ is 1, A is phenyl and B is t-butyl.
11. The compound according to claim 1, wherein X is 3-$CH_3$, $n$ is 1, A is phenyl and B is t-butyl.
12. The compound according to claim 1, wherein X is 4-Cl, $n$ is 1, A is 4-chlorophenyl and B is t-butyl in the form of the hydrochloride salt.
13. The compound according to claim 1, wherein X is 2-$CH_3$, $n$ is 1, A is phenyl and B is t-butyl.
14. The compound according to claim 1, wherein X is 4-F, $n$ is 1, A is phenyl and B is t-butyl in the form of the hydrochloride salt.
15. The compound according to claim 1, wherein X is 4-Cl, $n$ is 1, A is phenyl and B is t-butyl in the form of the hydrochloride salt.
16. The compound according to claim 1, wherein X is H, $n$ is 1, A is phenyl and B is t-butyl in the form of the hydrochloride salt.
17. The compound according to claim 1, wherein X is H, $n$ is 1, A is phenyl and B is methyl in the form of the hydrochloride salt.
18. The compound according to claim 1, wherein X is 4-$SCH_3$, $n$ is 1, A is phenyl and B is t-butyl in the form of the hydrochloride salt.
19. The compound of the formula:

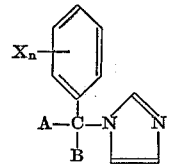

wherein X is H, $n$ is 1, A is cyclopropyl and B is phenyl.

20. The compound according to claim 1, wherein X is 4-Cl, $n$ is 1, A and B are cyclopropyl in the form of the hydrochloride salt.
21. The compound of the formula:

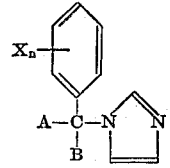

wherein X is H, $n$ is 1, A is

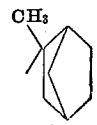

and B is phenyl.

22. The compound of the formula:

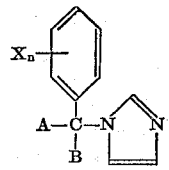

wherein X is H, $n$ is 1, A is

and B is phenyl.

References Cited
UNITED STATES PATENTS

| | | | |
|---|---|---|---|
| 3,629,273 | 12/1971 | Draber et al. | 260—296 R |
| 3,660,577 | 5/1972 | Buchel et al. | 424—273 |
| 3,647,815 | 3/1972 | Hegedus | 260—309 |
| 3,255,201 | 6/1966 | Beaman et al. | 260—309 |

OTHER REFERENCES

Staab et al., Chem. Abstracts, vol. 65, 12,194–b to 12,195–c, October 1966.

ALAN L. ROTMAN, Primary Examiner

U.S. Cl. X.R.

260—247.1, 247.5 R, 268 BZ, 268 H, 293.7, 294.9, 296, 309; 424—250, 263, 267, 273